US012689682B2

(12) United States Patent
Nguyen et al.

(10) Patent No.: US 12,689,682 B2
(45) Date of Patent: Jul. 21, 2026

(54) SYSTEMS AND METHODS FOR HIGH-PERFORMANCE PREFETCHING

(71) Applicant: Samsung Electronics Co., Ltd., Suwon-si (KR)

(72) Inventors: Marie Mai Nguyen, Pittsburgh, PA (US); Shaleen Garg, New Brunswick, NJ (US); Sudarsun Kannan, Rahway, NJ (US); Manish Parashar, Salt Lake City, UT (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 80 days.

(21) Appl. No.: 18/589,418

(22) Filed: Feb. 27, 2024

(65) Prior Publication Data

US 2025/0175532 A1 May 29, 2025

Related U.S. Application Data

(60) Provisional application No. 63/548,383, filed on Nov. 13, 2023, provisional application No. 63/603,115, filed on Nov. 27, 2023.

(51) Int. Cl.
*H04L 67/00* (2022.01)
*G06F 12/0882* (2016.01)

(52) U.S. Cl.
CPC .......... *H04L 67/34* (2013.01); *G06F 12/0882* (2013.01)

(58) Field of Classification Search
CPC ..... H04L 67/34; H04L 67/00; G06F 12/0882; G06F 9/38
See application file for complete search history.

(56) References Cited

U.S. PATENT DOCUMENTS

| | | | |
|---|---|---|---|
| 6,959,320 B2 | 10/2005 | Shah et al. | |
| 7,085,879 B2 * | 8/2006 | Aasheim | G06F 3/0643 711/170 |
| 7,707,359 B2 | 4/2010 | Mesard et al. | |
| 9,535,843 B2 | 1/2017 | Zhuang et al. | |
| 10,397,368 B2 | 8/2019 | Cherubini et al. | |
| 11,327,891 B2 | 5/2022 | Park et al. | |
| 11,507,516 B2 | 11/2022 | Roberts et al. | |
| 2005/0267878 A1 * | 12/2005 | Mogi | G06F 16/24552 |
| 2007/0106849 A1 | 5/2007 | Moore et al. | |
| 2008/0016106 A1 * | 1/2008 | Worrall | G06F 16/13 707/999.102 |

(Continued)

FOREIGN PATENT DOCUMENTS

| | | |
|---|---|---|
| CN | 111787062 A | 10/2020 |
| CN | 115470157 A | 12/2022 |

*Primary Examiner* — Tonia L Dollinger
*Assistant Examiner* — Mehulkumar J Shah
(74) *Attorney, Agent, or Firm* — Renaissance IP Law Group LLP

(57) ABSTRACT

Methods and apparatuses described herein may include requesting, by an application via a runtime-level interface, a data structure from an operating system (OS) for use in prefetching data for the application. The methods and apparatus may also include receiving, by the application via the runtime-level interface from the OS, the data structure, in some embodiments. The methods and apparatuses may also include prefetching, by the application data to be used in the application based on the information in the data structure.

20 Claims, 7 Drawing Sheets

(56) References Cited

U.S. PATENT DOCUMENTS

| | | | | |
|---|---|---|---|---|
| 2008/0127131 | A1* | 5/2008 | Gao | G06F 8/41 |
| | | | | 717/136 |
| 2013/0268850 | A1* | 10/2013 | Kyprianou | G06F 40/166 |
| | | | | 715/255 |
| 2016/0378667 | A1 | 12/2016 | Roberts et al. | |
| 2019/0265987 | A1* | 8/2019 | Shrivastava | G06F 12/126 |
| 2022/0091911 | A1* | 3/2022 | Du | G06F 9/461 |
| 2022/0107916 | A1* | 4/2022 | Curtis-Maury | G06F 3/0643 |
| 2023/0008874 | A1* | 1/2023 | Stabrawa | G06F 9/45558 |
| 2023/0054696 | A1* | 2/2023 | Kappes | G06F 9/5011 |

* cited by examiner

200

```
1   void prefetcher(uinode* inode, int fd, off_t offset,
        size_t prefech_size)) {
2
3       struct cache_info info;
4       size_t prefetch_limit = 0;
5
6       prefetch_limit = offset + prefech_size;
7       info->cache_state_bitmap = inode->cache_state_bitmap;
8       while (offset < prefetch_limit) {
9           readahead_info(fd, offset, size, &info);
10          offset = predict(&info);
11      }
12      ...
13  }
```

FIG. 2

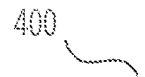
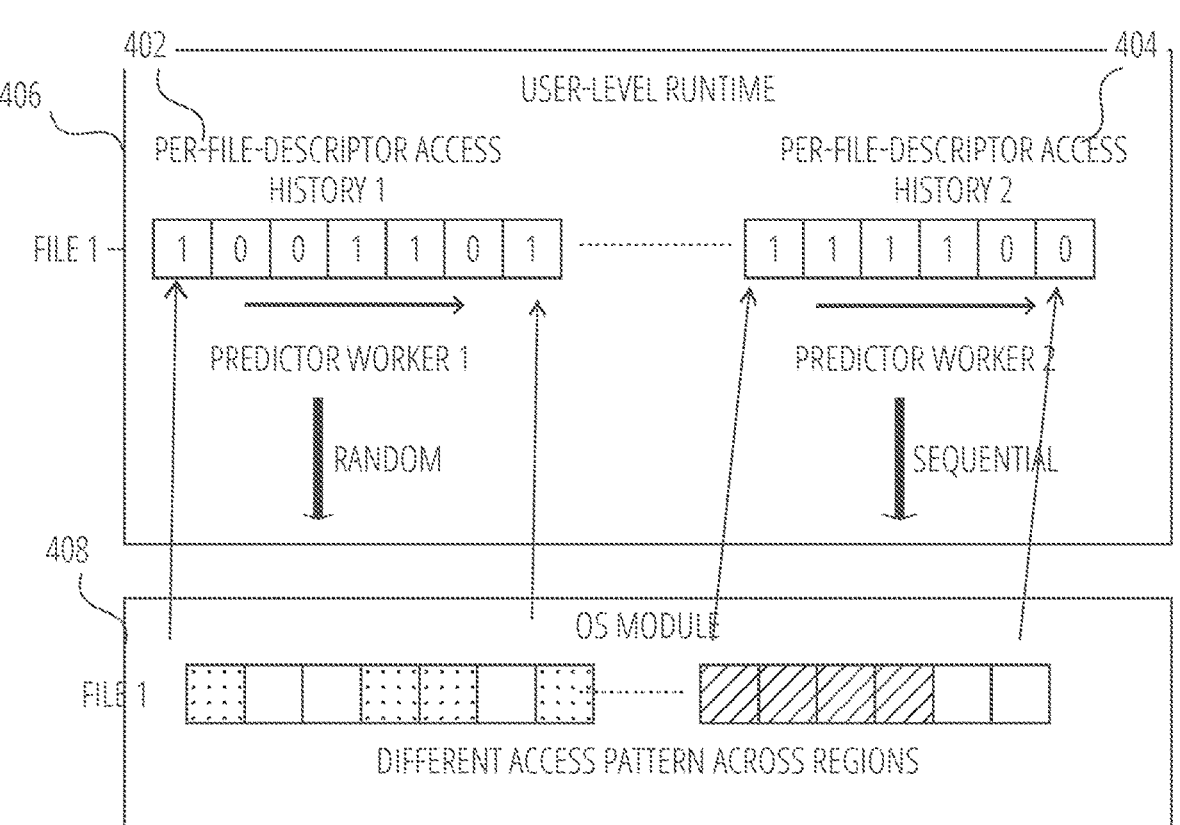
FIG. 4

500

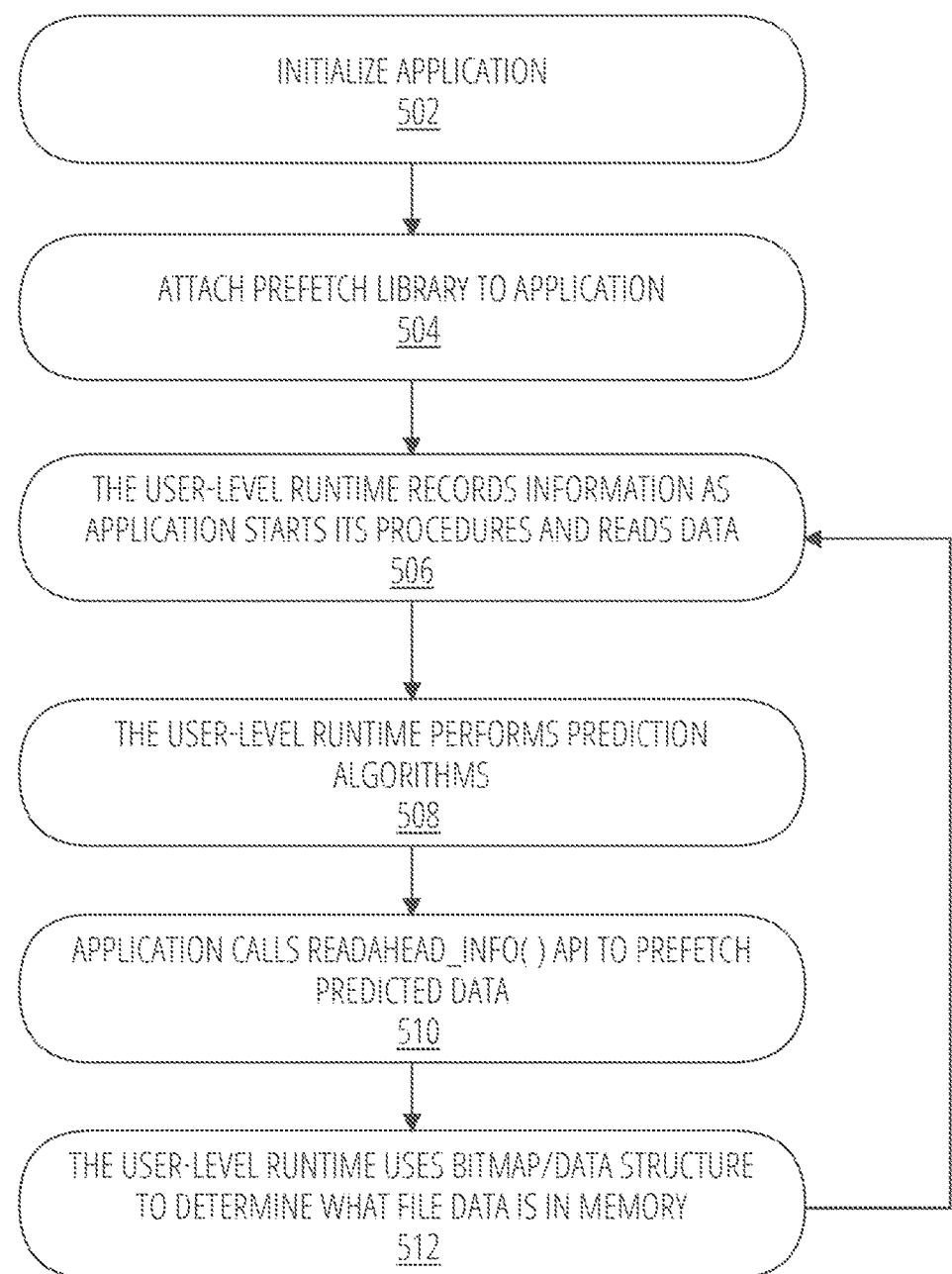

INITIALIZE APPLICATION
502

ATTACH PREFETCH LIBRARY TO APPLICATION
504

THE USER-LEVEL RUNTIME RECORDS INFORMATION AS
APPLICATION STARTS ITS PROCEDURES AND READS DATA
506

THE USER-LEVEL RUNTIME PERFORMS PREDICTION
ALGORITHMS
508

APPLICATION CALLS READAHEAD_INFO( ) API TO PREFETCH
PREDICTED DATA
510

THE USER-LEVEL RUNTIME USES BITMAP/DATA STRUCTURE
TO DETERMINE WHAT FILE DATA IS IN MEMORY
512

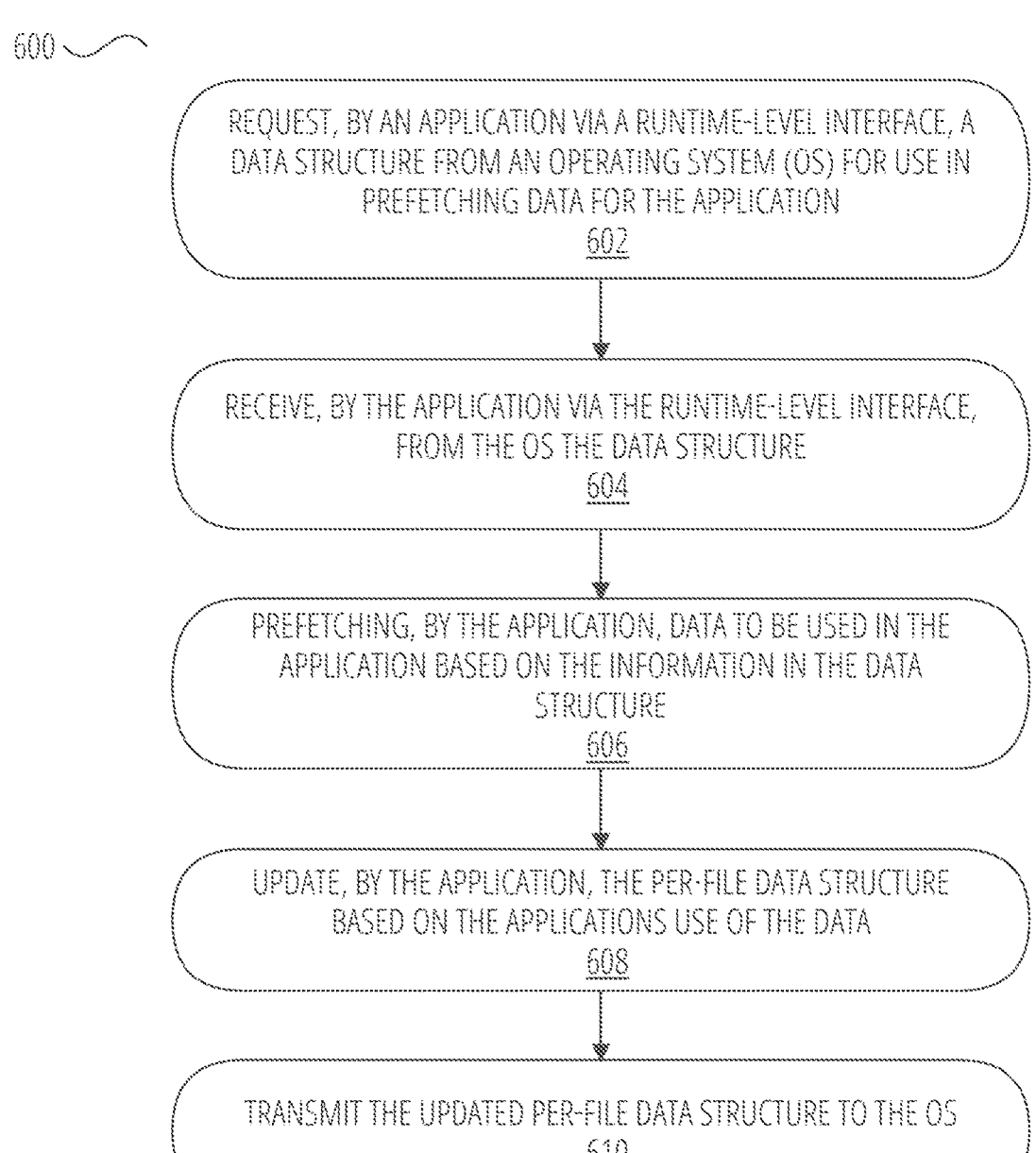

REQUEST, BY AN APPLICATION VIA A RUNTIME-LEVEL INTERFACE, A DATA STRUCTURE FROM AN OPERATING SYSTEM (OS) FOR USE IN PREFETCHING DATA FOR THE APPLICATION
602

RECEIVE, BY THE APPLICATION VIA THE RUNTIME-LEVEL INTERFACE, FROM THE OS THE DATA STRUCTURE
604

PREFETCHING, BY THE APPLICATION, DATA TO BE USED IN THE APPLICATION BASED ON THE INFORMATION IN THE DATA STRUCTURE
606

UPDATE, BY THE APPLICATION, THE PER-FILE DATA STRUCTURE BASED ON THE APPLICATIONS USE OF THE DATA
608

TRANSMIT THE UPDATED PER-FILE DATA STRUCTURE TO THE OS
610

FIG. 6

SYSTEMS AND METHODS FOR HIGH-PERFORMANCE PREFETCHING

CROSS-REFERENCE TO RELATED APPLICATIONS

This application claims priority to, and the benefit of, U.S. Provisional Patent Application Ser. No. 63/548,383 titled "CROSSPREFETCH: ACCELERATING I/O PREFETCHING FOR MODERN STORAGE" filed Nov. 13, 2023; and U.S. Provisional Patent Application Ser. No. 63/603,115 titled "CROSS-LAYERED AND LOW-INTERFERENCE HIGH-PERFORMANCE PREFETCHING" filed Nov. 27, 2023, which are both incorporated by reference.

TECHNICAL FIELD

This disclosure relates generally to operating systems, and more specifically to systems, methods, and apparatus for prefetching data in operating systems.

BACKGROUND

Storage systems face problems with continuous needs for faster systems. Loading data and coherency of such systems is also a concern in such storage systems.

The above information disclosed in this Background section is only for enhancement of understanding of the background of the invention and therefore it may contain information that does not constitute prior art.

BRIEF SUMMARY

According to some embodiments, methods and apparatuses may include requesting, by an application via a runtime-level interface, a data structure from an operating system (OS) for use in prefetching data for the application. The method may also include receiving, by the application via the runtime-level interface, from the OS the data structure. The method may include prefetching, by the application, data to be used in the application based on the information in the data structure, in some embodiments.

In some embodiments, data structure may be a per-file data structure. The per-file data structure may be a bitmap, according to some embodiments. A bit in the bitmap may map to a block in the file of the per-file data structure, in some embodiments. The per-file data structure may be updated by the OS during read, write, and prefetch operations. The application may use an application level copy of the per-file data structure to check for cached pages, in some embodiments. The method may include updating, by the application, the per-file data structure based on the applications use of the data, and transmit the updated per-file data structure to the OS. The application may use a counter to track and update the state of the data to be used, in some embodiments.

According to some embodiments, a computing apparatus may include a processor, a memory storing instructions that, when executed by the processor, configure the apparatus to request, by an application via a runtime-level interface, a data structure from an OS for use in prefetching data for the application. The apparatus may also receive, by the application via the runtime-level interface, from the OS, the data structure. The apparatus may also prefetch data to be used in the application based on the information in the data structure.

In some embodiments the data structure may be a per-file data structure. The per-file data structure may be a bitmap. A bit in the bitmap may map to a block in the file of the per-file data structure. The per-file data structure may be updated by the OS during read, write, and prefetch operations. The application may use an application level copy of the per-file data structure to check for cached pages, in some embodiments. The memory storing instructions that, when executed by the processor, may further configure the apparatus to update, by the application, the per-file data structure based on the applications use of the data, and transmit the updated per-file data structure to the OS, in some embodiments.

The system may include an OS. The system may also include a memory. The system, in some embodiments may include a user-level runtime with a runtime-level interface configured to request, by an application, via the runtime-level interface, a data structure from the OS for use in prefetching data for the application. The system also includes receiving, by the application via the runtime-level interface, from the OS the data structure. The system, in some embodiments, may include prefetching, by the application, data to be used in the application based on the information in the data structure.

In some embodiments the data structure may be a per-file data structure. The per-file data structure may be a bitmap, in some embodiments. A bit in the bitmap may map to a block in the file of the per-file data structure. The per-file data structure may be updated by the OS during read, write, and prefetch operations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates exemplary code for an exemplary function call, in accordance with example embodiments of the disclosure.

FIG. 4 illustrates an example embodiment of the user-level runtime performing predictive prefetching, in accordance with example embodiments of the disclosure.

FIG. 5 illustrates a flow chart for initialization and prediction-based prefetching, in accordance with example embodiments of the disclosure.

FIG. 6 illustrates a flow chart for prefetching, in accordance with example embodiments of the disclosure.

DETAILED DESCRIPTION

Figure 1:
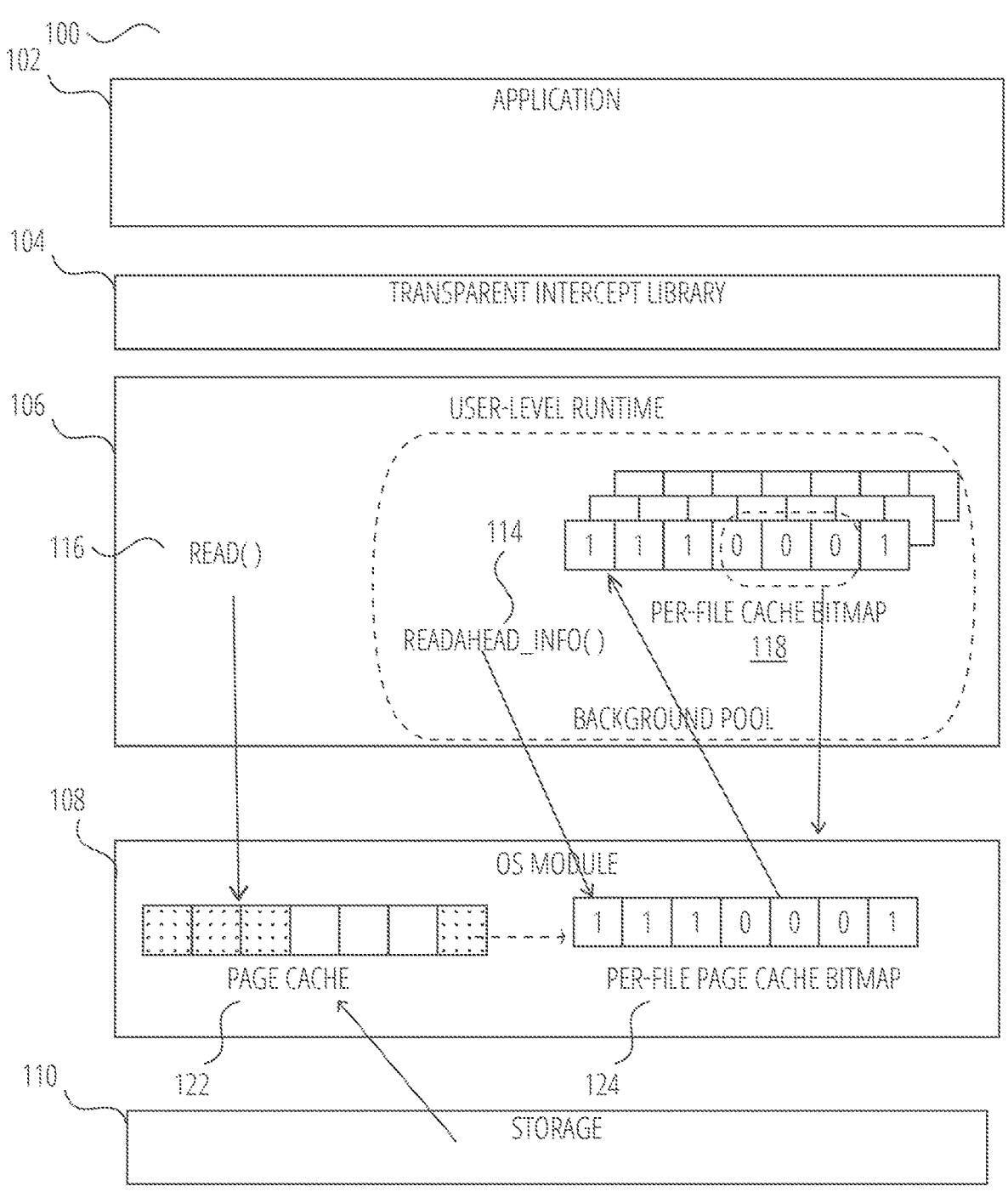
FIG. 1 illustrates an exemplary prefetching OS, in accordance with example embodiments of the disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

Prefetching can be used to load data in an application by the Operating System (OS) for faster access by loading into Random Access Memory (RAM) from a local or remote storage drive. Prefetching sometimes does not retrieve the complete file. Some prefetch systems may inefficiently prefetch application's data, and cause bottlenecks or conflicting locks/access to the files. Data retrieval systems which retrieve data ahead of use may not often retrieve the full file. Lacking the full file may cause inefficiencies as more and more data files get retrieved by applications above the OS.

Embodiments described herein include methods and systems for user-level software to gain visibility of cache and Input/Output (I/O) prefetching state, by tracking and sharing transparently the state of each file in the page cache, and prefetch progress between OS and user-level runtime. Embodiments include parallel prefetching and I/O via, for example, range bitmaps with scalable range trees. Multiple application threads using the same or different file descriptors may concurrently access non-conflicting ranges of a file, by having a range tree with per-node range and per-node lock. Alternative data structures, such as arrays, linked lists, records, hash tables, graphs, binary trees, Adelson-Velsky and Landis (AVL) trees, etc. may be used as well.

Embodiments include cross-layered system designs enabling visibility of I/O prefetching states between applications and OS's. In some aspects, a cross-layered system may include a system which communicates between an OS or a system level software and a higher layer software application that functions with an application or user interface. Some embodiments described herein may track and share prefetching progress between the OS, and user-level software. In some embodiments, a user-level cross-layered prefetch runtime may transparently capture prefetched and/or missing I/O page states of each file in the cache. Further, some embodiments may capture I/O access patterns and automatically issue prefetch requests for missing data pages to reduce cache misses and I/O. In some embodiments, the disclosed system can avoid and/or reduce prefetching system calls thereby reducing the system calls as well as locking bottlenecks. Further, prefetching bottlenecks on remote and disaggregated storage may be reduced according to some embodiments.

FIG. 1 illustrates an exemplary Prefetching OS 100, in accordance with example embodiments of the disclosure. FIG. 1 illustrates an exemplary high-level depiction of the per-file data structure and cross-layer visibility, between OS and runtime level enabled by embodiments described herein. According to some examples, the Prefetching OS 100 may include an Application 102, a transparent intercept library 104, a user-level runtime 106, an OS Module 108, and a Storage 110. User-level runtime 106 may optimize Input/Output prefetching of individual files of an application. For a file of an application, user-level runtime 106 may use transparent intercept library 104 to modify Application Programming Interface (API) calls and change the arguments passed (by the runtime to the OS) as a layer to Portable OS Interface (POSIX) I/O, and prefetch calls issued by Application 102.

When a file is opened, the user-level runtime 106 may initialize one or more files and their file descriptor structures. When an I/O request (for example, read( ) 116 or write( )) or a system call to the file is issued, predictors for embodiments described herein, may identify the access patterns of the application on the file and recommend bytes to prefetch. The predictors may include prediction for future use of a file by an application, and how much or which data should be prefetched based on patterns of use. User-level runtime 106 may then issue a readahead_info( ) 114 system call to prefetch blocks, and export the OS Module 108's per-file cache state. The predictor may use the same application thread, whereas the prefetch calls may be issued using dedicated background threads. User-level runtime 106 may also be used for adapting to the memory budget and performing aggressive prefetching and cache evictions, in some embodiments.

An OS level component, such as OS Module 108 may maintain the cache state and prefetching related information, which may be exported to user-level runtime 106. The OS Module 108 may separate the regular I/O and the prefetching paths to reduce contention between threads issuing regular I/O and those issuing prefetch operations. In some aspects, contentions may include file locks, Page Cache 122 locks, journal locks, and memory manager locks.

When a file is opened, the OS Module 108 may initialize one or more data structures, such as Per-file Page Cache Bitmaps 124. For an I/O call (such as read( ) 116 or write), the OS Module 108 may update one or more data structures, such as the Per-file Page Cache Bitmap 124 after pages are fetched or evicted from the cache. OS Module 108 may handle the readahead_info( ) 114 system call by first checking that the requested data blocks are fully or partially present, or absent. OS Module 108 may then adjust prefetch requests according to the data blocks status. OS Module 108 may then issue the request. When returning from the I/O call, the OS Module 108 may export the file's Per-file Cache Bitmap 118 to user-level runtime 106. OS Module 108 may include various optimizations and flexibility in the I/O prefetching path and prefetch parameters removing some static limits. FIG. 2 illustrates exemplary code for an exemplary function call 200, in accordance with example embodiments of the disclosure.

Figure 3:
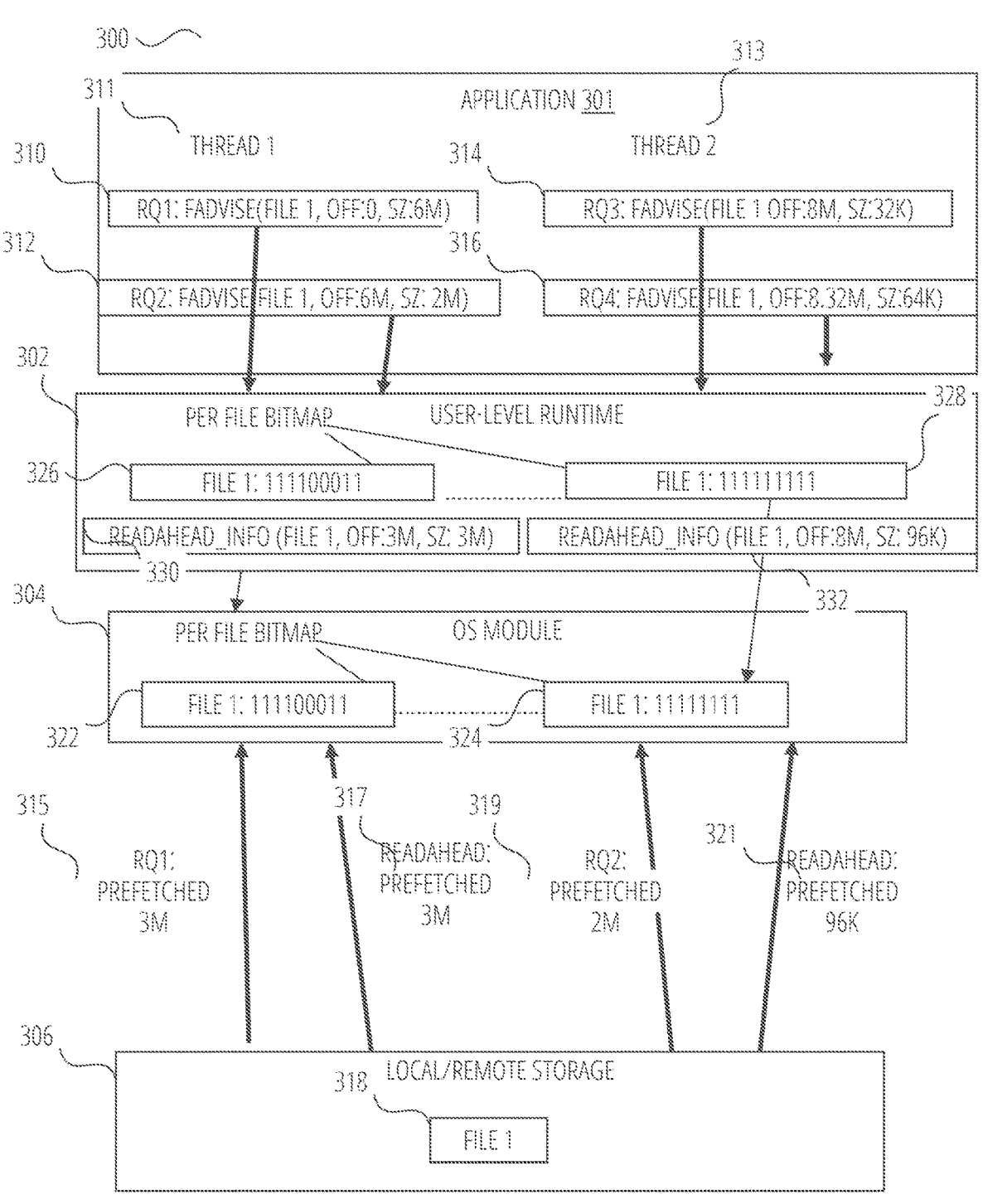
FIG. 3 illustrates an exemplary prefetching system, in accordance with example embodiments of the disclosure.

FIG. 3 illustrates an exemplary Prefetching System 300, in accordance with example embodiments of the disclosure. Application 301 and user-level runtime 302 may benefit from having visibility into the cache state and the progress/status of prefetching requests, as it allows them to evaluate the effectiveness of prefetching and adjust future requests accordingly. Embodiments described herein enable cache visibility and prefetch awareness with minimal performance overhead, and no application changes. Embodiments described herein may include part of one or more API's, such as readahead_info( ) 114. An info parameter may be included, for example, which may be a data structure storing the per-file bitmap and other information about the file. This is used as an example and not intended as limiting in any way.

The readahead_info( ) 114 system call may extend existing OS prefetch calls, such as readahead( ), fdavice( ), and mdavice( ) as shown in FIG. 2, for example. The extending may include inheriting part or all of the parents' function and including additional data (or data structures) and functional capabilities to the parent function. The info structure may store prefetching-related information such as a cache state, cache hits and misses, and prefetching effectiveness. The user-level runtime 302 may use a readahead_info( ) 114 system call and the info structure to read the per-file bitmap 326-328 for prediction and future prefetch operations. The per-file bitmap 326-328 may be stored in the user-level runtime 302 in some embodiments, and updated according to use and prediction methods described herein. Further, the per-file bitmap 326-328 may be transmitted to OS Module 304 in some embodiments.

Embodiments described herein may include delineating the I/O prefetching and regular I/O paths when possible. Some embodiments may use a stateful per-file bitmap at the OS level, in OS Module 304, for example, to track the cache state and improve prefetching efficiency. Stateful may include the status of accessed blocks or pages of a file as used by one or more threads, for example. This may be used in conjunction with a per-file cache tree. Each bit in the bitmap may represent or map to a block in the file (by default), and the bitmap may be an array of unsigned longs, for example, that may grow and/or shrink with the file size. This bitmap may also be imported to the user-level runtime 302. In other embodiments, integers, shorts, or any other type of data types may be used.

Updating the Bitmaps or Data Structures in OS Module 304

The per-file (or per-inode) bitmap or data structures, may be continually updated during read, write, and prefetch operations. A slow and/or a fast path may be used to reduce the contention of a single big per-file cache-tree lock between regular I/O and prefetch operations.

During I/O operations such as read( ), and write( ), the OS Module 304 may use a slow path (versus fast prefetch lookups below) that involves checking for the requested block's presence in the cache by traversing a per-file large array or data structure of pointers (for example, Xarray). This walk may be done using a page vector that records the availability of multiple blocks in the cache. When a block is missing from the cache, a read request may be issued for it, and the per-file (or per-inode) cache bitmap may be updated. During this process, the cache-tree lock may be held, causing contention with concurrent prefetch operations and impacting prefetching effectiveness. A cache-tree as used herein may be one or more hierarchical cache structures where the data may be accessed concurrently by different threads. A lock may include locking or controlling access to the nodes of the cache-tree structure to ensure viability of the thread. Locks may be global locks, read/write locks, or even fine grained locks for example.

Fast Prefetch Lookups

The user-level runtime 302 may use the user-level copy of the per-file bitmap 326-328 to check for cached pages. When a readahead_info 330-332 is issued, the OS Module 304 may use the fast path for the file's bitmap lookup by acquiring the bitmap's rw-lock to reduce lock contention with regular I/O. When more pages are requested and inserted into the cache, readahead_info 330-332 may use a slow path by acquiring a write lock. Using simple bitmap operations may be used to help increase the speed of operations. To further reduce contention, OS Module 304 may update the per-file bitmap 322-324 once, after completing the walk, rather than updating for each page.

Some applications, such as for example, molecular simulations or databases, may utilize per-thread file descriptors to allow for concurrent access to shared files across multiple threads or processes. These threads may use their file descriptors to read from or write to specific regions of the files. For example, some applications employ per-thread file descriptors for concurrent I/O to share log and database files between client and background threads.

According to some embodiments, application threads Thread 1 303-Thread 2 305 may check the per-file cache bitmap, while a dedicated set of helper threads may issue actual prefetch requests to the OS. As a result, concurrent updates and access to per-inode (an inode may be a data structure in certain file systems that describes a file-system object such as a file or a directory) bitmaps may be performed in serial order using read-write locks (rw-locks). Some embodiments may utilize per-inode bitmap locks to allow concurrent access across threads to the shared file. To reduce concurrency bottlenecks across application threads, some embodiments may maintain a separate bitmap for each thread or a file descriptor and import a file's cache bitmap from the OS Module 304.

Some embodiments may include a concurrent per-file range tree. A range tree may be an ordered tree data structure (such as a binary tree) that holds a list of data points. The range tree may track a range of blocks accessed by each thread using their private or shared file descriptor. Each node of the range tree may represent a contiguous range of blocks, with each range/node with its own lock. Each node may also embed a bitmap or data structure, with each bit representing, for example, one block in the range. The range of a block may dynamically increase or reduce, based on one or more range of blocks accessed by each thread, along with the corresponding bitmap. By maintaining a range tree with per-node range and per-node locks, multiple application threads using the same or different file descriptors, may concurrently access non-conflicting ranges of a file, thereby reducing scalability bottlenecks, as well as avoiding replicating the bitmaps. Threads that access overlapping blocks may share the bitmap and can benefit from the awareness of pages already in the cache, thereby reducing redundant prefetch requests and associated overheads, in some embodiments.

Low-Overhead Prediction and Prefetching

Embodiments may provide effective cache prefetching that may adapt to different access patterns without high overhead. For example, a small data structure such as a per-file bitmap may be considered which uses only a few kilobytes or megabytes per file. To accomplish this, some embodiments may first detect the access pattern of a file by intercepting I/O operations (such as POSIX, for example) and decide on the number of blocks to prefetch. A pattern detector, according to some embodiments, may identify a wide range of access patterns, including sequential, random, forward/backward strides, and changes in access patterns.

The user-level runtime 302 may use one or more n-bit counters for each file to detect access patterns. The counter may indicate the level of sequentiality (for example, when several contiguous pages are being accessed, or inversely when pages are being accessed in random sequence) and may represent a file in several different states, for example:

Highly random (000, access distance beyond the maximum prefetch distance of 128 KB).

Random (001, random but within 128 KB distance).

Partially random (010, a mix of sequential and random access).

Likely-sequential (011, frequent sequential interspersed with random access).

Sequential (100, sequential but with strides). And

Definitely sequential (110).

Additional states or variations may be considered. For example, a subset such as 2 or 3 of the states may be considered in some embodiments.

When a read or write operation occurs, the user-level runtime may increment or decrement the counter's value depending on whether the previous access was sequential, and the counter's value may determine the blocks to prefetch. According to some embodiments, where a file is opened, the system may start in a "definitely random" state, meaning no blocks are prefetched. However, as sequential accesses increase, prefetched blocks may also increase by 2n, for example, where n is the value of the access pattern counter. To avoid issuing prefetch calls for blocks already in the page cache, the user-level runtime may check the cache-bitmap and modify the prefetch request for blocks not in the cache.

The user-level runtime 302 may identify a variety of I/O access patterns, such as sequential, random, forward/backward strides, etc. This predictor may intercept each I/O and quickly assess a file's transition or oscillation between access patterns. Moreover, the number of bits used for the per-file counter may be configured to improve prefetch accuracy. According to some embodiments, a 3-bit counter may provide the best performance without over-prefetching for different workloads with varying access patterns. To optimize the predictions and reduce the overheads of pattern detection, once a steady state is reached (for example, definitely sequential, or random), the user-level runtime 302 may delay predictions for the next n accesses. The user-level runtime 302 may utilize the cross-layered capabilities of OS Module 304 and runtime prefetching, reducing frequent system calls and related overheads.

File Descriptor Prefetching

An access pattern detector may be maintained for each descriptor, and a user space file descriptor structure that contains block range information and access pattern counters may be used. In one example, Thread 1 311 and Thread 2 313 may access File 1 318 on Local/Remote Storage 306 at the same time. For example, Thread 1 311 may submit Request 1 310 via user-level runtime 302. Request 1 310 may use fadvise( ) in a request for 6 Mb of File 1 data, beginning at offset 0. In response to the request, the OS Module 304 may supply Prefetched Request 1 315 with only 3 Mb of the 6 Mb requested. In response, user-level runtime 302 may use readahead 1 330 in requesting the remaining 3 Mb of File 1 beginning at offset 3 Mb. Readahead 1 Prefetched 317 may be transmitted by the Local/Remote Storage 306 in response.

Readahead 1 Prefetched 317 may submit the remaining 3 Mb of File 1 318, in response to readahead 1 330 with a request for the 3 Mb beginning at Offset 3 Mb. In a parallel fashion, Thread 2 313 may access File 1 318 because Thread 2 313 is accessing a different part of the File 1 318. Therefore, Request 3 314 and Request 4 316 are requests for 32 Kb at offset 8 Mb and 64 Kb at offset 8.32 Mb of File 1 318, respectively. Readahead 2 332 then requests via OS Module 304 these respective areas of File 1 318. Readahead 2 Prefetched 321 thus submits the requested 96 Kb total memory for use by Thread 2 313.

FIG. 4 illustrates an example embodiment 400 of a user-level runtime 406 performing predictive prefetching in coordination with OS Module 408, in accordance with example embodiments of the disclosure. Each file descriptor may have some additional metadata created to track its access history. For example, when Thread 1 303 accesses file 1 in a random pattern while Thread 2 305 accesses file 1 in a sequential pattern, prefetching may only occur for non-overlapping regions of the file accessed by Thread 1 303 as illustrated. Each "1" in Per-File-Descriptor Access History 1 402 and Per-File-Descriptor Access History 2 404 illustrates an access in, for example, a byte, in a page of a file. Per-File-Descriptor Access History 2 404 illustrates 4 pages in a row which are accessed. Per-File-Descriptor Access History 1 402 illustrates tracking of Predictor Worker 1 tracking a random pattern of access. Per-File-Descriptor Access History 2 404 illustrates tracking of Predictor Worker 2 tracking a sequential pattern of access.

In cases of overlapping accesses across file descriptors, the user-level runtime 406 may use cache state awareness to avoid redundant prefetching while ensuring cache hits. The user-level runtime 406 may use one bit in the cache-bitmap for the entire range in the range-tree and prefetching the whole range when memory is scarce in some embodiments.

Memory-Aware Aggressive Prefetching and Eviction

Embodiments described herein include improving I/O performance for varying memory availability and changing access patterns, including high and low-intensity I/O phases. Embodiments may delegate prefetching control to the user-level runtime, which may use pages cache awareness to adjust prefetching and eviction, based on memory budgets set by applications, containers, Virtual Machines (VMs), or system administrators. Some embodiments may utilize the available memory budget to aggressively prefetch from the start of an application, and reduce high compulsory cache misses (for example, blocks loaded to the cache for the first time). This may be deemed an improvement over Oses employing incremental prefetching, which may suffer from high initial cache misses.

Aggressive I/O Prefetching

In some embodiments, the user-level runtime may constantly monitor memory usage and adjust prefetch aggressiveness accordingly, to make the best use of available memory. The user-level runtime may check system memory availability from the start and set higher and lower threshold values to indicate when to stop aggressive prefetching and when to stop all prefetching, respectively. System administrators may customize these values using a configuration file, in some embodiments. When a file is opened, the user-level runtime may assume that it is sequential and prefetch some blocks (for example, 2 MB) before enough I/O has been issued to detect access patterns. When this prediction is correct and the file is marked as "definitely" sequential, embodiments described herein may issue larger prefetch requests (when the budget allows), speeding up access to the file and reducing cache misses. When the prediction is incorrect, the user-level runtime may default to regular prefetching, stopping prefetching when a file is detected as random. The user-level runtime may be extended to support customized prefetching policies and window sizes based on a file's priority, in some embodiments.

Aggressive Reclamation

To aggressively reclaim cache pages, embodiments described herein may employ a multi-pronged approach. The user-level runtime 302 may maintain per-process memory budgets, and monitor active and inactive files using Least Recently Used (LRU) techniques. When memory budgets are low, inactive file cache pages may be forcefully evicted. Further, for large files, in addition to the page-level evictions performed by the OS LRU, embodiments described herein may evict infrequently accessed pages using per-file cache state through the use of APIs which tell the kernel how it expects to use a file handle, for example, fadvice( ).

Support for Memory-Mapped I/O

Memory-mapped I/O may be used by applications for read-intensive workloads to reduce system call and data copy overheads between an OS and the user space. However, predicting and prefetching for Memory-mapped I/O without explicit I/O calls may present a challenge. To address this, embodiments described herein may leverage the cross-layered cache bitmap state. When an application issues a Memory-mapped I/O call (for example, mmap( )), the user-level runtime may invoke a background thread that periodically queries an inode's cache state. Using the cache state, the access pattern detector may determine the number of pages to prefetch.

Optimizing OS Prefetching Path

According to some embodiments, the OS may be extended to allow higher-level layers such as the user-level runtime, to dynamically increase the prefetch limit using one or more readahead_info system calls info structures. For example, the user-level runtime may issue a prefetch request up to 1.2 GB that matches a NVMe bandwidth. Large requests may not adversely impact blocking I/O because the OS Virtual File System layer may limit any I/O request to a maximum (for example, 2 MB requests), and the existing OS prefetch congestion control may defer prefetch requests that delay the dispatch of blocking I/O (such as read or write). Embodiments described herein, may reduce the overhead of prefetch operations to iterate the array of pointers, and reduce cache hit costs, using a delineated path for prefetch and blocking I/O operations, and reducing contention of cache tree locks, and accelerating prefetching performance.

Some embodiments may be implemented regardless of the underlying OS file systems which may use a virtual file system, and storage device. Some embodiments may be implemented without any modifications to the application code necessary. Applications may link the user-level runtime, which intercepts POSIX I/O operations to predict access patterns and prefetch accordingly. The user-level runtime may also implement a transparent intercept library or API calls, for using the readahead_info system call to prefetch data, access the cache state using a bitmap, get per-process memory usage from the OS, and for the user-level runtime to communicate with the OS to relax rigid prefetch limits.

FIG. 5 illustrates a Flow Chart 500 for initialization and prediction-based prefetching, in accordance with example embodiments of the disclosure. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The method may begin at block 502 where one or more applications initialize. The initialization may occur when a user opens an application. Initialization may include initializing file and file descriptor structures and starting the application's process in the OS Module 108. Initialization may also occur as the system draws various applications for use based upon its need. In block 504, the method may attach a prefetch Library to the application as described in embodiments herein. Attaching a prefetch library enables the user level runtime to access data in the OS that allows more efficient and accurate prefetching via the extended APIs. The prefetch library may include user-level runtime 106 including the OS Module 108. The prefetch library may further include user-level runtime 302 as well as the OS Module 304 elements. In block 506, the method may record reads and writes of the application as the application begins its procedures. One or more counters may be used as described herein. Counters may be used to detect access patterns, for example indicating when pages are accessed in sequence or randomly.

In block 508, the user-level runtime may perform one or more prediction algorithms to proactively prefetch according to patterns of use of the applications data or files. The user-level runtime may segregate if a read access pattern is sequential or is strided. For example, a file may be divided into pages, where each page is four kilobytes. When the file is being accessed one page after another (1234), the method may identify it as sequential. When the file is accessed in a simple pattern, such as every second page, then this may be identified as a strided pattern. The patterns may be indicated and predicted as sequential, strided, and random, for example.

In block 510, the method may call a function to prefetch predicted data. For example, readahead_info( ) may be called, in some embodiments. The user-level runtime library may use readahead_info( ) to prefetch data from the OS Module, as an exemplary function. The function call may enable full retrieval of the file data. In some embodiments, additional data specified in the function call may be retrieved from one or more files for an application. In block 512, the method may use one or more bitmaps to know what file data is in memory. Additionally, data structures may be used in tracking what file data is in the memory. For example, an array, a linked list, records, a hash table, a graph, binary trees, AVL trees, etc. may be used in tracking the data retrieved from the file. In some embodiments, the method may return to block 506 when the application continues to run and further prediction and tracking is desired.

FIG. 6 illustrates a Flow Chart 600 for managing data structures used in prefetching, in accordance with example embodiments of the disclosure. In block 602, the method may request, by an application via a runtime-level interface, a data structure from an OS for use in prefetching data for the application. In some embodiments the data structure may be a per-file data structure such a bitmap. Each bit may indicate the pages that are being accessed in the file that is prefetched. In block 604, the method may receive the data structure by the application, via the runtime-level interface from the OS. In some embodiments, system level function calls may be extended so that prefetching may include retrieving the full file, or the remaining pages of a file for an application. In block 606, the method may prefetch data to be used in the application based on the information in the data structure. For example, the information may indicate that the full file should be retrieved. The tracking of an applications use of the file data and passing of the data structure or bitmap between the application layer and the OS creates a cross-layered awareness of the OS cache state, which enables the runtime to perform more precise and effective prefetching, thereby avoiding under or over-prefetching, and avoiding redundant system calls. When sharing data across one or more threads in large-scale applications, embodiments may realize concurrent I/O prefetching across non-conflicting blocks. Utilizing preapplication access patterns, per-file cache states, and the available free memory, embodiments may adjust prefetching aggressiveness to reduce cache misses and alleviate I/O bottlenecks.

In block 608, the method may update the per-file data structure based on the applications use of the data. In block 610, the method may transmit the updated per-file data structure to the OS.

The data structure may be a per-file data structure. The per-file data structure may further be a bitmap. In some embodiments, each bit in the bitmap may represent or map to one or more blocks in the file associated with the per-file data structure. The per-file data structure may be updated by the OS during reads, writes and prefetch operations in some embodiments. The application may use an application level copy of the per-file data structure in order to check for cached pages in some embodiments. In some embodiments, the application may use a counter to track and/or update the state of the data to be used according to methods described herein.

Figure 7:
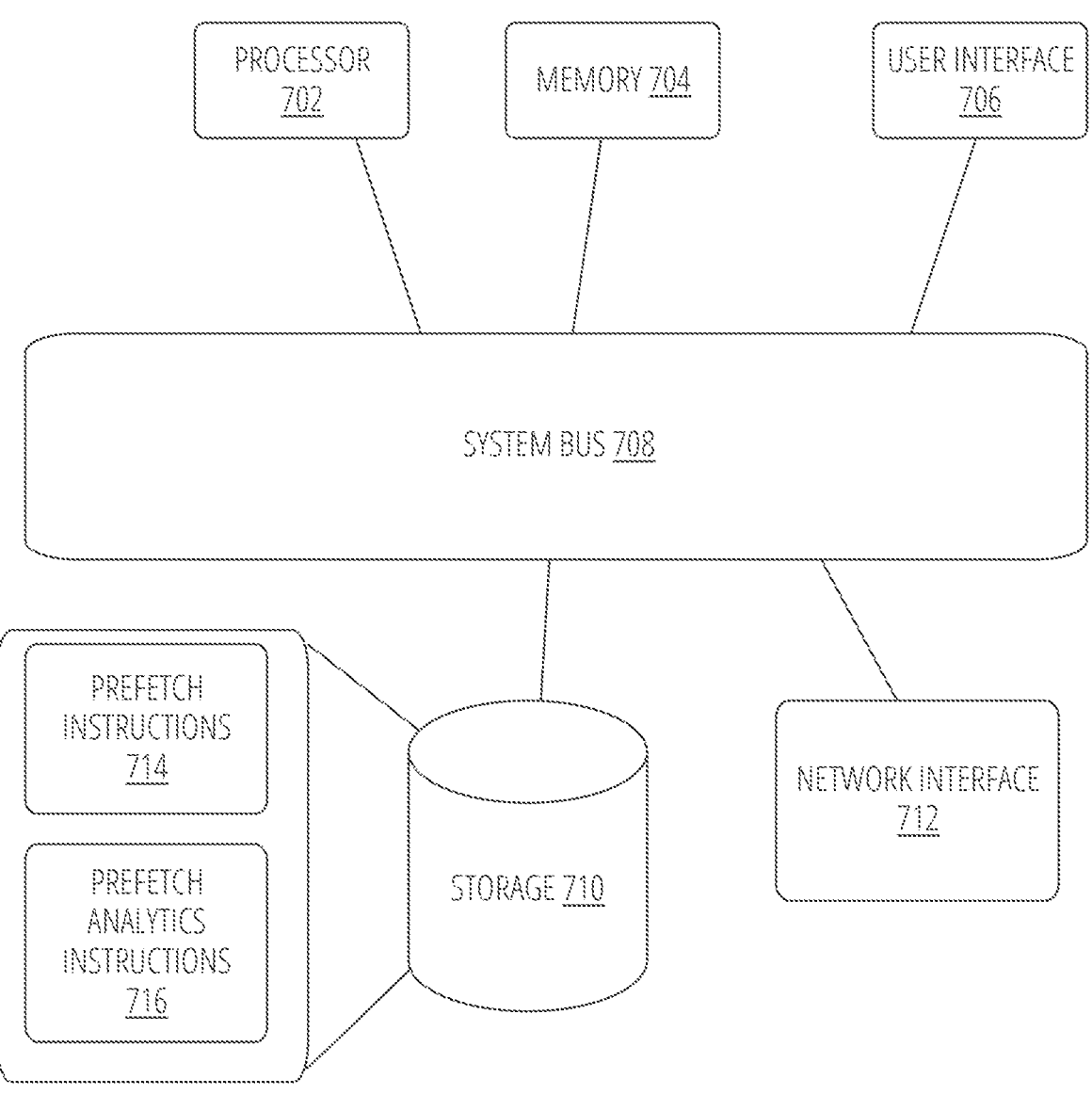
FIG. 7 is an example schematic diagram of a system for managing data structures used in prefetching data, in accordance with example embodiments of the disclosure.

FIG. 7 is an example schematic diagram of a system 700 for prefetching data, in accordance with example embodiments of the disclosure. The system 700 includes a processing circuitry 702 coupled to a Memory 704, a Storage 710, a User Interface 706 (or GUI), and a Network Interface 712. In an embodiment, the components of the system 700 may be communicatively connected via a System Bus 708. The system 700 may be designed for managing prefetch or data retrieval operations with a sharing of data structures helping manage and predict the prefetch/data retrieval operations.

System Bus 708 may include any interfaces and/or protocols including Peripheral Component Interconnect Express (PCIe), Nonvolatile Memory Express (NVMe), NVMe-over-fabric (NVMe-oF), Ethernet, Transmission Control Protocol/Internet Protocol (TCP/IP), User Datagram Protocol (UDP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, Hypertext Transfer Protocol (HTTP), CXL, and/or the like, or any combination thereof.

The processing circuitry 702 may be realized as one or more hardware logic components and circuits. For example, and without limitation, illustrative types of hardware logic components that can be used include field Central Processing Units (CPUs), programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information. The processing circuitry 702 may be used for actively retrieving and prefetching data, managing and predicting the use of data to be retrieved by user-level applications.

The Memory 704 may be volatile (e.g., RAM, etc.), non-volatile (e.g., ROM, flash memory, etc.), or a combination thereof. In one configuration, computer readable instructions to implement one or more embodiments disclosed herein may be stored in the Storage 710.

In another embodiment, the Memory 704 is configured to store software for managing prefetching and retrieving data. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 702, cause the processing circuitry 702 to perform the various processes described herein. Specifically, the instructions, when executed, cause the processing circuitry 702 to prefetch, predict and store reads and writes of the application level software.

The Storage 710 may be a Solid-State Device (SSD), magnetic storage, optical storage, and the like, and may be realized, for example, as flash memory or other memory technology, CD-ROM, Digital Versatile Disks (DVDs), or any other medium which can be used to store the desired information. Storage 710 may store Prefetch Instructions 714 which execute according to Flow Chart 500 as well as Prefetch Analytics Instructions 716 which execute according to the appropriate prediction, read and write tracking techniques as discussed. The Network Interface 712 allows the system 700 to communicate with the cloud server network for the purpose of, for example, receiving data, sending data, and the like.

It should be understood that the embodiments described herein are not limited to the specific architecture illustrated in FIG. 7, and other architectures may be equally used without departing from the scope of the disclosed embodiments.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method comprising:

requesting, by an application via an application interface, a per-file data structure that comprises a concurrent per-file range tree from an Operating System (OS) for use in retrieving data for the application, the per-file data structure storing prefetching-related information;

receiving, by the application via the application interface, from the OS the per-file data structure; and retrieving, by the application, data to be used in the application based on the prefetching-related information in the per-file data structure.

2. The method of claim 1, wherein the per-file data structure comprises a bitmap.

3. The method of claim 2, wherein a bit in the bitmap maps to a block in the concurrent per-file range tree.

4. The method of claim 3, wherein the per-file data structure is modified by the OS based on read, write, and retrieval operations.

5. The method of claim 1, wherein the application uses an application copy of the per-file data structure to check for cached pages.

6. The method of claim 1, wherein the application uses a counter to track and update a state of the data.

7. The method of claim 1, further comprising:

modifying, by the application, the per-file data structure based on the application's use of the data; and transmitting the per-file data structure to the OS based on modifying the per-file data structure.

8. The method of claim 1, wherein the concurrent per-file range tree comprises a node representing a contiguous range of blocks.

9. A computing apparatus comprising:

a processor, and a memory storing instructions that, when executed by the processor, configure the apparatus to:

request, by an application via an application interface, a data structure that comprises a bitmap from an Operating System (OS) for use in retrieving data for the application, the data structure storing per-file cache state information;

receive, by the application via the application interface, from the OS the data structure; and retrieving, by the application, data to be used in the application based on the per-file cache state information in the data structure.

10. The computing apparatus of claim 9, wherein the data structure comprises a concurrent per-file range tree.

11. The computing apparatus of claim 10, wherein a bit in the bitmap maps to a block in the concurrent per-file range tree.

12. The computing apparatus of claim 9, wherein the data structure is modified by the OS based on read, write, and retrieve operations.

13. The computing apparatus of claim 9, wherein the application uses an application copy of the data structure to check for cached pages.

14. The computing apparatus of claim 9, wherein the memory storing instructions that, when executed by the processor, further configure the apparatus to:

modify, by the application, the data structure based on the application's use of the data; and transmit the data structure to the OS based on modifying the data structure.

15. The computing apparatus of claim 9, wherein the data structure comprises a node with a corresponding per-node range and per-node lock.

16. A system comprising:

an operating system (OS);

a memory; and an application with an application interface configured to:

request, by the application, via the application interface, a per-file data structure that comprises a concurrent per-file range tree from the OS for use in retrieving data for the application, the per-file data structure storing prefetching-related information;

receive, by the application via the application interface, from the OS the per-file data structure; and retrieve, by the application, data to be used in the application based on the prefetching-related information in the per-file data structure and a detected access pattern associated with the data.

17. The system of claim 16, wherein the per-file data structure comprises a bitmap.

18. The system of claim 17, wherein a bit in the bitmap maps to a block in the concurrent per-file range tree.

19. The system of claim 18, wherein the per-file data structure is modified by the OS based on read, write, and retrieval operations.

20. The system of claim 16, wherein the concurrent per-file range tree comprises a node representing a contiguous range of blocks.

* * * * *